Aug. 9, 1938.　　　　F. D. STEMEN　　　　2,126,512
RODENT AND ANIMAL TRAP
Filed March 4, 1937　　　2 Sheets-Sheet 1

Inventor
F. D. Stemen
By Clarence A. O'Brien
Hyman Berman
Attorneys

Aug. 9, 1938.    F. D. STEMEN    2,126,512
RODENT AND ANIMAL TRAP
Filed March 4, 1937    2 Sheets-Sheet 2
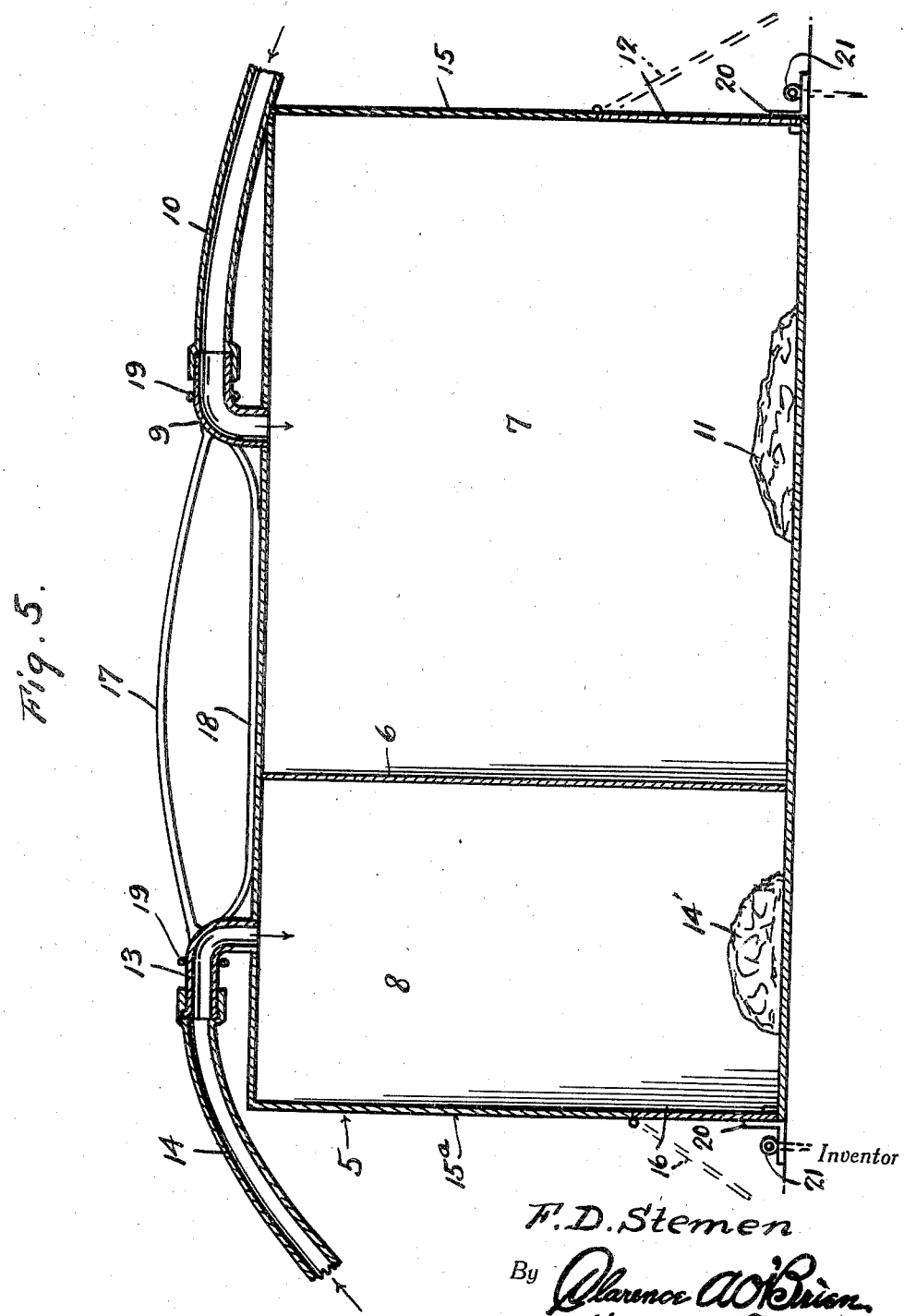

Patented Aug. 9, 1938

2,126,512

UNITED STATES PATENT OFFICE 2,126,512

RODENT AND ANIMAL TRAP

Fremont D. Stemen, Linngrove, Ind.

Application March 4, 1937, Serial No. 129,032

1 Claim. (Cl. 43—65)

This invention relates to a trap for catching rodents and animals and an object of the invention is to provide a trap of simple construction which at the same time will serve adequately for catching such rodents as mice, ground moles and the like as well as for catching larger animals such as squirrels, skunks, mink, foxes and the like; and the invention together with its objects and advantages will be best understood from a study of the following description taken in connection with the accompanying drawings wherein:—

Figure 5 is an enlarged vertical sectional view through the trap.

Figure 1:
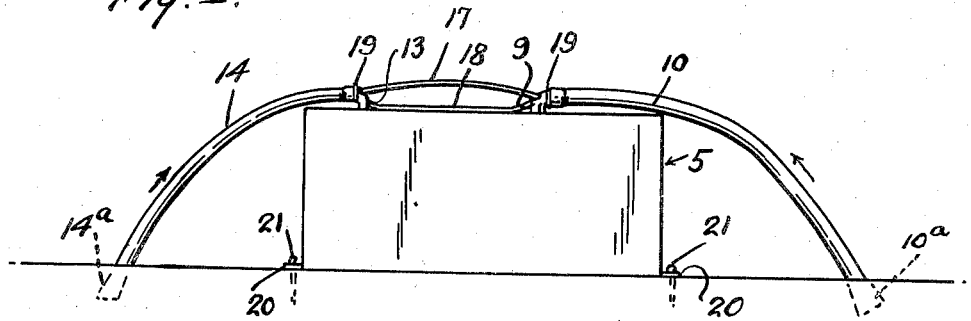
Figure 1 is a side elevational view of the trap.
Figure 2:
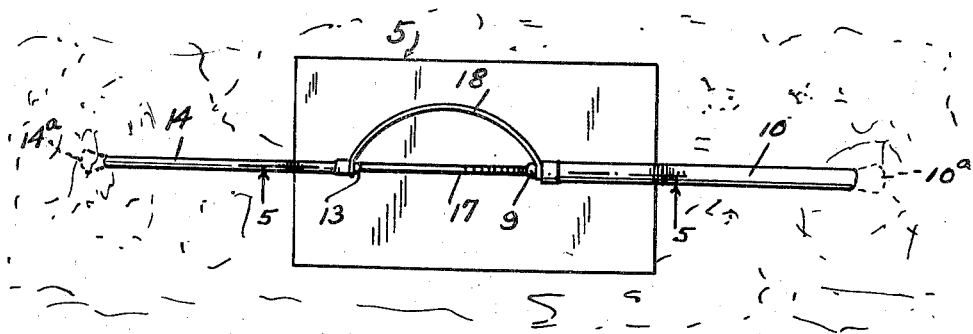
Figure 2 is a top plan view thereof.
Figure 3:
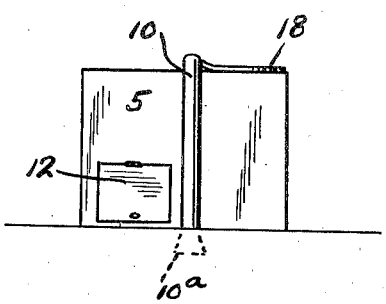
Figure 3 is an elevational view of one end of the trap.
Figure 4:
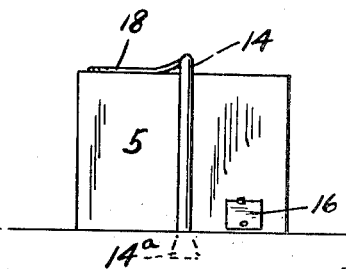
Figure 4 is an elevational view of the opposite end of the trap.

Referring to the drawings by reference numerals it will be seen that the trap comprises a shell-like casing 5 divided by a partition 6 into a relatively large compartment 7 adapted to accommodate squirrels, foxes, and the like and a relatively smaller compartment 8 adapted to accommodate mice, or the like.

For the compartment 7 there is attached to the top wall of the casing 5 one end of an elbow 9 that is of relatively large diameter and sleeved on the free end of the elbow 9 is one end of a flexible tubular conduit 10 which may be of any suitable material. The elbow 9 thus provides an entrance passage for the chamber 7 and access to the chamber 7 for placing or removing bait 11, or for removing animals confined within the compartment 7 is had through an opening provided in an end wall 15 of the casing 5, and for which opening there is provided an upwardly swinging door 12.

Also for the compartment 8 there is tapped into the top of the shell or casing 5 an elbow 13 of relatively smaller diameter and sleeved on the free end of the elbow 13 is one end of a flexible conduit 14. The elbow 13 thus provides an entrance passage for the compartment 8, and access to the compartment 8 for removing or placing the bait 14' therein or for removing rodents, such as mice or the like trapped therein is had through an opening provided in the end wall 15a of the casing or shell 5, and for which opening there is provided an upwardly swinging door 16. (See Figure 5.)

To facilitate carrying the trap from place to place there is provided therefor a handle 17 in the form of a longitudinally bowed rod welded or otherwise made integral with the elbows or intake passages 9 and 13.

Also for securing the trap in position there is provided a rope 18 which may be wrapped about a tree trunk and its respective opposite ends then tied or otherwise secured as at 19 to the elbows 9 and 13; while L-shaped lugs 20 are suitably secured to the end walls 15, 15a of the trap and have horizontal apertured flanges to accommodate stakes or the like 21 for use in further anchoring the trap securely.

In this connection it will also be appreciated that a rope may be passed about the trunk of a tree and its relatively opposite ends secured to the apertured flanges of the lugs 20 for securing the trap against removal if found desirable.

At their respective free ends the flexible conduits 10, 14 are flared as at 10a and 14a respectively, and these flared open ends may either rest on the ground or may be disposed within the ground below ground level as shown depending upon the type of animal or rodent one desires to catch in the trap.

It is thought that a clear understanding of the construction, utility and advantages of a trap of this character will be had without a more detailed description.

Having thus described the invention, what is claimed as new is:—

A trap of the class described comprising a casing, a partition therein dividing the casing into two chambers, an elbow-shaped tubular member connected with the top of each chamber and in communication with the upper part of the chamber, a conduit forming member connected with each elbow-shaped member and a handle member extending between the elbow-shaped members and connected therewith.

FREMONT D. STEMEN.